Sept. 2, 1969  L. F. EVERETT  3,464,872
RESILIENT MATERIALS
Original Filed Oct. 7, 1963

United States Patent Office 3,464,872
Patented Sept. 2, 1969

3,464,872
RESILIENT MATERIALS
Lilian F. Everett, Biddenham, Bedford, England, assignor to Texfoam International Limited, London, England
Continuation of application Ser. No. 314,137, Oct. 7, 1963. This application Apr. 4, 1968, Ser. No. 718,958
Claims priority, application Great Britain, Oct. 18, 1962, 39,442/62
Int. Cl. B32b 5/18, 31/00
U.S. Cl. 156—79                                                5 Claims This application is a continuation of application Ser. No. 314,137, filed Oct. 7, 1963.

This invention relates to resilient materials suitable for use for upholstery, shock-absorbing, packing and like purposes.

The kind of material with which the invention is concerned is set foam material having a lattice structure, i.e., an open cellular or sponge-like stereo-reticulate structure, and of which well-known examples are rubber latex foam, either natural or synthetic, and polyurethane foam.

It is known to bond together layers of rubber foam and polyurethane foam to form composite upholstery pads and it has been proposed to mix together the liquid constituents for rubber latex foam and polyurethane foam, or to disperse crumb of one foam material in the other as a matrix, to produce a composite foam of the two constituent materials.

The present invention provides as a new product a resilient material consisting of a set rubber latex foam and a set polyurethane foam, in which each foam constituent has its own individual continuous lattice structure and the two structures are intermingled and coextensive so that they jointly form a mass occupying a space in common.

In a preferred form, the material of the present invention consists of rubber latex foam which has been formed on and within the structure of a set polyurethane foam so that the rubber latex foam covers the lattice structure of and extends through the interstices of the polyurethane foam.

In other words, the preferred material of the present invention consists of rubber latex foam formed on separately preformed and set polyurethane foam so that the rubber latex foam is stiffened or reinforced throughout its structure by the polyurethane foam.

The concept of rubber latex foam stiffened by polyurethane foam, both foams having their own identity in the same mass or occupied space, is one which well represents the surprising properties of the new complex foam material.

Rubber latex foam alone is a very soft material which it is difficult to produce in substantial uniform thickness without some form of internal support.

Polyurethane foam, on the other hand, is harder in the sense that it has a higher resistance to initial compression, although it tends to collapse under increased load, and can relatively easily be made in substantial uniform thickness.

The present invention utilises the initially hard or strong structure of polyurethane foam as a reinforcement or support for the rubber latex foam and it is found that the complex material has a hardness substantially greater than would be expected as the simple sum of the hardnesses of its two constituent foams. Moreover, the load/compression characteristic of the complex material is smoothly progressive, being similar to but higher than that of the rubber latex foam, and does not exhibit the abrupt compression characteristic of polyurethane foam.

The complex material of the present invention may be made by any method broadly comprising the steps of causing rubber latex liquid composition to expand as a foam through the interstices of a set polyurethane foam and then setting the rubber latex foam.

The rubber latex liquid composition may be used in the form of a dense fluid foam, produced in the known manner by an Oakes type mixer for example, this dense foam being caused to expand, by increase of cell or bubble size, through set polyurethane foam, such as in a mould under reduced pressure.

Alternatively, rubber latex liquid composition containing a gassing agent may be caused, in a manner known per se, to foam and expand through set polyurethane foam. The rubber latex composition and set polyurethane foam may be brought together in a mould, a pad or other body of set polyurethane foam being inserted in the mould already containing the rubber latex composition or the rubber latex composition being injected into the mould containing the pad or other body of set polyurethane foam, before expansion of rubber latex foam is effected.

To set the rubber latex foam it is necessary, as is well known, to cause coagulation of the latex system and then vulcanize it after which the complex material is washed and dried.

In general, the well-known methods of making rubber latex foam can be used, to produce the complex material of the present invention, with the additional step of introducing set polyurethane foam at the stage where the rubber latex composition is foamed or expanded to its final volume so that the rubber latex foam extends through the interstices of the polyurethane foam and occupies conjointly the same space.

As a further alternative, set polyurethane foam may be soaked with rubber latex liquid composition, such as by being passed between rollers to which unfoamed or densely foamed rubber latex liquid composition is supplied to be taken up by the polyurethane foam, as by a sponge, as it recovers from compression in the nip of the rollers. The polyurethane foam thus soaked or impregnated with rubber latex composition may then be subjected to treatment to cause the rubber latex to foam, or expand its existing foamed state, until it occupies the same volume as the polyurethane foam before being gelled, vulcanized and finished in the usual way.

One example of the production of a pad of the complex foam material according to the invention is illustrated diagrammatically on the accompanying drawing, in which.

Figure 1:
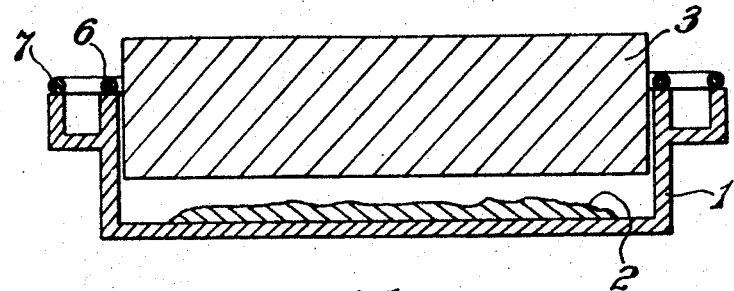
FIG. 1 is a vertical section of a mould base.
Figure 2:
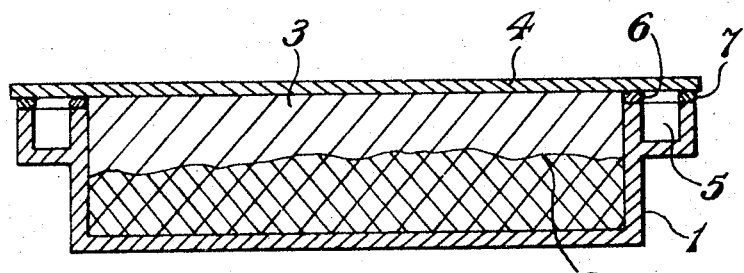
FIG. 2 is a corresponding vertical section of the mould closed.

In the base 1 of a mould there is poured a pool 2 of viscous rubber latex composition which may either be in the form of dense foam or contain a gassing agent, such as hydrogen peroxide.

A pad 3 of set polyurethane foam, previously formed, is placed in the mould base 1 and pressed down on to the pool of rubber latex composition by a mould closure plate 4 which extends over a moat 5 around the mouth of the mould base 1 and rests on an inner semipermeable gasket 6 and an outer sealing gasket 7.

The mould is now evacuated, by suction applied to the moat 5, causing expansion of the rubber latex composition as foam through the structure of the polyurethane foam pad 3 and this expansion continues until the rubber latex foam has filled the mould space and formed a skin-seal against the semipermeable gasket 6 whereupon pressure-reduction in the mould ceases.

The rubber latex foam is caused to gel by a suitable method, such as freezing and injection of carbon dioxide, and then vulcanized in the mould.

The complex pad is removed from the mould, washed and dried by the methods known for rubber latex foam.

Figure 3:
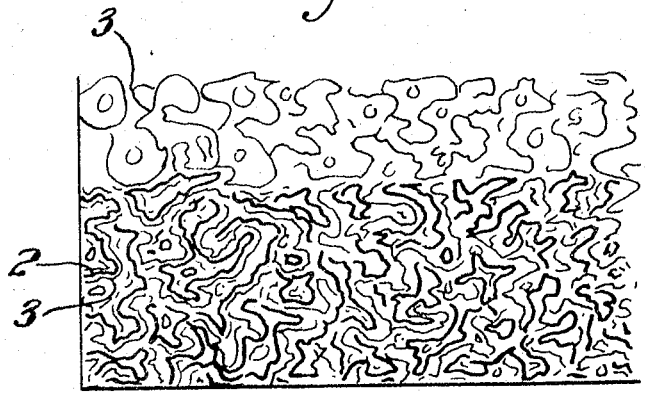
FIG. 3 is a very diagrammatic representation of the structure of the complex foam material on an enlarged scale.

The diagrammatic representation of the structure of the complex foam shown by FIG. 3 indicates by thin lines the foam structure of the polyurethane foam pad 3 and by thicker lines that of the rubber latex foam 2, the latter having been illustrated only in the lower part of the figure.

The production of rubber latex foam in the complex foam material is preferably carried out by the process known as the "Talalay Process" and developments thereof.

The following particulars are given of an experimental trial of the invention.

MATERIALS

Polyether foam supplied by Aeropreen Products Limited, England, as AOP 22 and having a density of 22 ozs. per cubic foot (22 kg./m.$^3$).

Butadiene styrene synthetic rubber latex supplied by International Synthetic Rubber Limited, England, as Intex 100.

From the polyether foam were cut two similar rectangular seat pads, one of which was used for making a complex foam pad and the other was used for comparative tests.

The rubber latex was compounded in the conventional way, with vulcanizing agents, accelerators and antioxidants, to make it suitable for the production of latex foam.

The latex compound was divided into two parts. From one part a seat pad, similar to the polyether pads, was made in the known way, using hydrogen peroxide and yeast as gassing agents. The dried pad of vulcanized latex foam had a density of 110 ozs. per cubic foot (110 kg./m.$^3$).

The remaining part of the latex compound was used with one of the polyether pads to make a complex foam pad in accordance with the invention. The complex foam pad, after vulcanization and drying had a density of 58 ozs. per cubic foot (58 kg./m.$^3$), the ratio of polyether foam to latex foam being 22:36.

The complex foam pad was found to be much firmer than the pad made entirely of rubber latex foam although substantially lighter in weight, in the ratio 58:110. In a comparative compression test, to compress each pad to 60% of its original thickness, the complex foam pad required a greater weight in the ratio 57:55.

The complex foam pad and the rubber latex foam pad were tried in use under similar conditions by use as seat cushions by the driver of a delivery van for a period of six months. On examination after this trial, the complex foam pad did not show any apparent damage, no loss of original thickness and less than 5% loss of original hardness. The latex foam pad had suffered some collapse and an appreciable loss of hardness, about 16%, in spite of its greater density.

The pad of polyether foam alone was not suitable for comparative test as a seat cushion because of its known characteristic of high initial hardness but rapid compression under increasing load.

The invention therefore offers a substantial practical and economic advantage. As compared with latex foam, its performance is better with a substantial saving in weight and at about the same cost, the price of polyether foam and rubber latex foam separately being about the same.

I claim:

1. A method of making a resilient body of an open cellular material of given shape and dimension which comprises the steps of providing an open cellular, set, resilient, polyurethane foam body of the same shape and dimensions as the resilient body to be made, extending and expanding a foamable rubber latex liquid composition through the interstices of said polyurethane foam body until the rubber latex foam extends continuously throughout the entire said polyurethane foam body so as to be coextensive therewith and conjointly occupy therewith a space in common, setting said rubber latex foam by gelling and vulcanizing said set rubber latex foam.

2. A method according to claim 1, in which rubber latex liquid composition in the form of dense fluid foam is caused to expand through the interstices of set polyurethane foam.

3. A method according to claim 1, in which rubber latex liquid composition containing a gassing agent is caused to foam and the foam is caused to expand through the interstices of set polyurethane foam.

4. A method according to claim 3, in which said set polyurethane foam and said rubber latex liquid composition are brought together in a mould which is closed and in said mould the pressure is reduced to cause rubber latex foam to evolve and expand in the mould.

5. A method according to claim 1, in which said rubber latex liquid composition in the form of a dense fluid foam and said set polyurethane foam are brought together in a mould which is closed and in said mould the pressure is reduced to cause said dense fluid foam to expand in the mould.

References Cited

UNITED STATES PATENTS 2,927,876  3/1960  Hoppe et al. _____ 156—79

FOREIGN PATENTS 748,990  5/1956  Great Britain.

EARL M. BERGERT, Primary Examiner

C. B. COSBY, Assistant Examiner

U.S. Cl. X.R.

161—190; 260—2.5; 264—46